(12) United States Patent
Eldic

(10) Patent No.: US 10,659,916 B2
(45) Date of Patent: *May 19, 2020

(54) RETROSPECTIVE PATH ANALYSIS

(71) Applicant: Bluedot Innovation Pty Ltd, East Melbourne, Victoria (AU)

(72) Inventor: Filip Eldic, Richmond (AU)

(73) Assignee: Bluedot Innovation PTY LTD, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,896

(22) Filed: Jul. 18, 2019

(65) Prior Publication Data

US 2019/0342701 A1 Nov. 7, 2019

Related U.S. Application Data

(63) Continuation of application No. 15/827,316, filed on Nov. 30, 2017, now Pat. No. 10,362,442, which is a continuation of application No. 15/608,720, filed on May 30, 2017, now Pat. No. 9,838,842, which is a continuation of application No. PCT/IB2015/002299, filed on Nov. 16, 2015.

(30) Foreign Application Priority Data

Dec. 3, 2014 (AU) .............................. 2014904898

(51) Int. Cl.
*H04W 4/029* (2018.01)
*H04W 4/021* (2018.01)

(52) U.S. Cl.
CPC .......... *H04W 4/021* (2013.01); *H04W 4/029* (2018.02)

(58) Field of Classification Search
CPC .............................. H04W 4/021; H04W 4/029
See application file for complete search history.

(56) References Cited

U.S. PATENT DOCUMENTS

| | | | |
|---|---|---|---|
| 8,489,127 B2 * | 7/2013 | Huang | G01S 5/0257 455/457 |
| 2008/0019317 A1 | 1/2008 | Vellanki et al. | |
| 2010/0090852 A1 | 4/2010 | Eitan et al. | |

(Continued)

OTHER PUBLICATIONS

European Extended Search Report, European Application No. 15865697. 5, dated Jun. 26, 2018, 5 pages.

(Continued)

*Primary Examiner* — Wayne H Cai
(74) *Attorney, Agent, or Firm* — Fenwick & West LLP

(57) ABSTRACT

To determine whether a mobile device has entered a geo-fenced region, a first geo-location of the mobile device at a first time is identified. Also, a second geo-location of the mobile device at a second time is identified. A potential travel path of the mobile device is determined between the first geo-location and the second geo-location. The potential travel path is in at least two dimensions. A determination is made as to whether the potential travel path intersects with the predetermined geo-fenced region. If the potential travel path intersects the predetermined geo-fenced region by an amount that satisfies an intersection requirement, a determination is made that the mobile device entered the predetermined geo-fenced region.

7 Claims, 9 Drawing Sheets

(56) References Cited

U.S. PATENT DOCUMENTS

| | | | |
|---|---|---|---|
| 2013/0217411 A1* | 8/2013 | Croy | H04W 4/021 |
| | | | 455/456.1 |
| 2014/0194192 A1 | 7/2014 | Pierce, II et al. | |
| 2014/0279123 A1 | 9/2014 | Harkey et al. | |
| 2015/0058125 A1 | 2/2015 | Moshfeghi | |
| 2015/0204680 A1 | 7/2015 | Lee et al. | |

OTHER PUBLICATIONS

PCT International Search Report and Written Opinion, PCT Application No. PCT/IB2015/002299, dated Mar. 30, 2016, 10 pages.
United States Office Action, U.S. Appl. No. 15/827,316, dated Jun. 7, 2018, 17 pages.
United States Office Action, U.S. Appl. No. 15/827,316, dated Nov. 27, 2018, 8 pages.

* cited by examiner

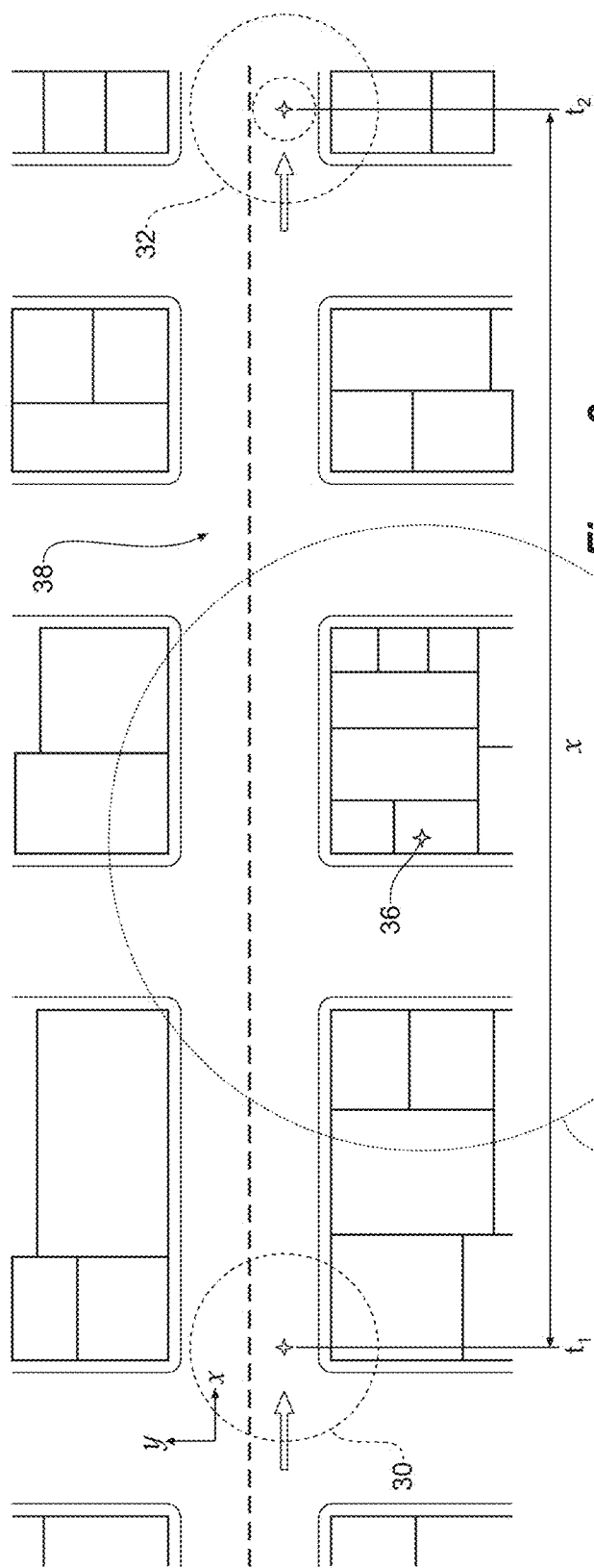
*Figure 3*
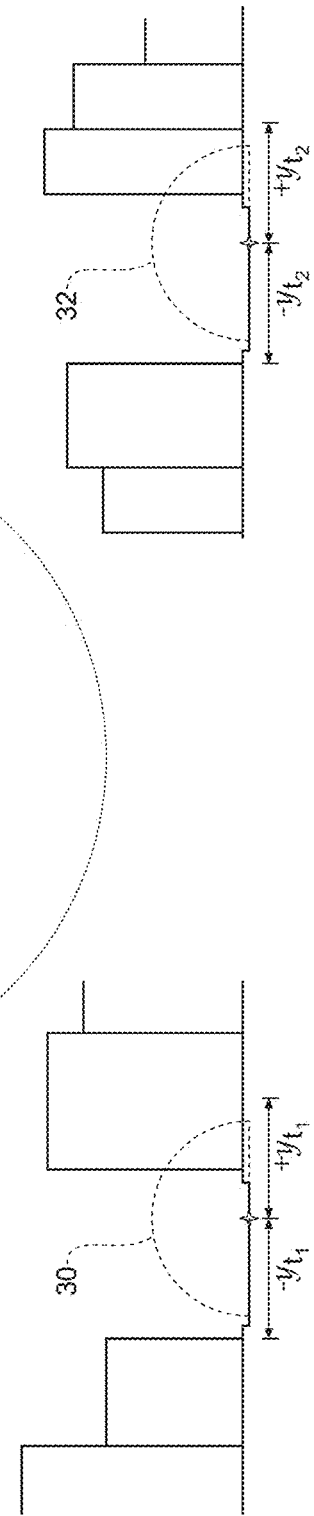
*Figure 4a*
*Figure 4b*

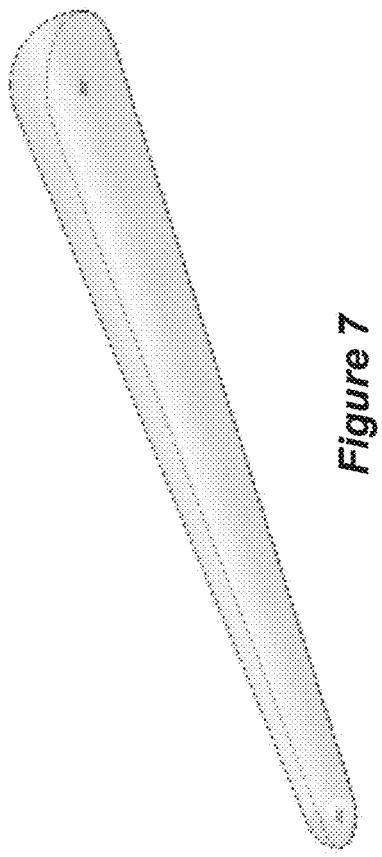
Figure 7
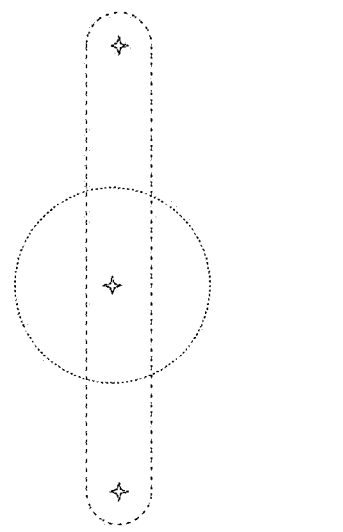
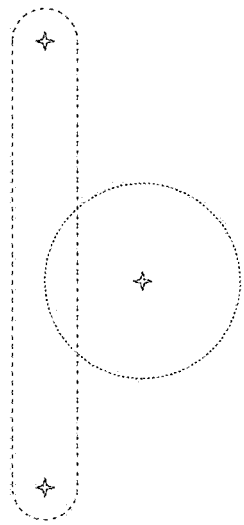
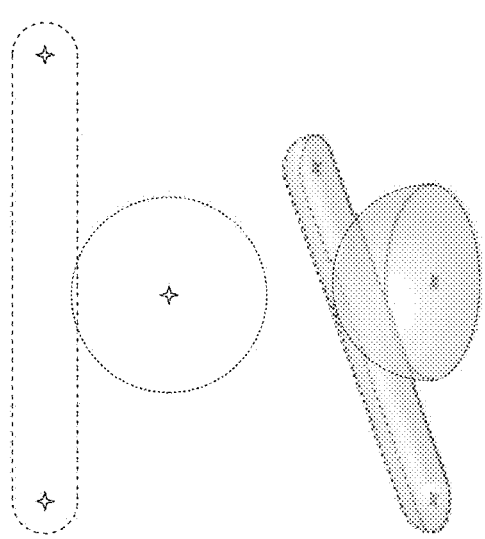
Figure 8c
Figure 8b
Figure 8a

RETROSPECTIVE PATH ANALYSIS

CROSS-REFERENCE TO RELATED APPLICATIONS

This application is a Continuation of U.S. patent application Ser. No. 15/827,316 filed Nov. 30, 2017, which is a Continuation of U.S. patent application Ser. No. 15/608,720 filed May 30, 2017, now U.S. Pat. No. 9,838,842, which is a Continuation of International Application No. PCT/IB2015/002299, filed on Nov. 16, 2015, which claims the benefit of Australian Provisional Application No. 2014904898, filed on Dec. 3, 2014, all of which are hereby incorporated by reference in their entireties.

FIELD OF ART

The field of the disclosure is location determination and in particular geo-fence entry based on location determination.

BACKGROUND

A geo-fence is a virtual area defined by co-ordinates of a geographic mapping system the shape of the geo-fence is not limited by terrain, buildings or other boundaries physical or political.

Determination of a geographic location (geo-location) using the same mapping system that is used to define the geo-fence can be achieved using a multitude of mechanisms. By way of example, one such mechanism is the Global Positioning System (GPS). GPS includes multiple satellites and a sophisticated array of ground stations and controls to broadcast coded radio frequencies that when received and decoded by a purpose built electronic device can output time and location within the GPS geographic mapping system. GPS is but one of many such geo-locating systems.

It is possible, having decided on a geo-location system and the associated geographic framework to adapt the geo-location determined by one system to another but this is not typical.

The word geo-location can also be determined by latitude and longitude coordinates of a particular location and may also include altitude. Terms and definitions like latitude, longitude and altitude are standardized by ISO/IEC 19762-5:2008.

There will first be a predetermined location (as defined by a determined latitude and longitude pair) such as at a shop, place of business, toll-way entrance, event entrance, etc. and in the simplest version of a geo-fence, a single radial distance is used to define a circular boundary of the geo-fence. Thus all the latitudes and longitude pairs that exist within the circular area defined by the geo-fence are known. Entry to or proximity to such a virtual fence can then be determined by matching the determined latitude and longitude pair of the device which determines its location with all the pairs within the geo-fenced area, and if there is a match the device is within the geo-fence.

The detection of entry into a geo-fenced area can be used to alert the user of the mobile device that they are at that time likely to be close to the shop, place of business, entered the toll-way, or entered the event, etc. This information is potentially valuable to the user and particularly valuable to the shop, business, toll-way and event organizer in numerous ways some of which will be helpful and most of which will be or economic worth to the user or business.

There is much more to the process than simply described above but the principle should be apparent.

The shape of the fence is typically determined by the intended use of the geo-fence and the related function or result of detection of entry to the geo-fenced area.

Geo-fencing as a technique is used to understand if a device has entered any previously determined geographic location. The prerequisites for a device to locate itself are as follows:

A device with the capability to use one of many methods to determine its location.

A device with the ability to maintain a log of predetermined areas/lines/points, expressed as a combination of coordinates as defined by a standardized geodetic system or framework—i.e. WGS84 ellipsoid.

A device with the capability to calculate and ascertain if a location that has been established for the device, is located within or without a predetermined area and communicate this awareness or perform actions based on it.

Most modern computer devices and particularly those that have mobile telephonic capabilities will have a location determination capability which is used by one or more of the applications on the mobile device sporadically, at defined, or undefined intervals. FIG. 1 illustrates the prior process of mobile device determination of entry of the mobile device into a predetermined geo-fenced area.

FIG. 1 depicts a prior art approach to geo-fencing where a predetermined location is identified as a latitude/longitude (herein referred to as a lat/long pair for brevity) is depicted as lat/long pair (lt0, lg0) for example, 34.9290° S, 138.6010° E, which for the purposes of the example, is a city council office location. The calculation of the lat/long envelope of a circle about the lat/long pair having a radius 'r' is non-trivial since it is necessary to accommodate the WGS84 ellipsoid sphere assumed to apply to the curvature of the earth but for relatively short distances (say less than 1 kilometre then a flat earth approximation will suffice) and in this case 100 meters is the chosen radius r. However, there is more than one software program that will provide the information required to allow for a determination as to whether a particular lat/long pair determined by a mobile device lies within the envelope of the radius of the origin predetermined location lat/long pair of $(lt_0, lg_0)$.

As indicted in FIG. 1, the first time a geolocation of the lat/long of the mobile device is determined and the lat/long pair is $(lt_1, lg_1)$ and the second time a geolocation of the lat/long of the mobile device and the lat/long pair is $(lt_2, lg_2)$.

A comparison of the first and second lat/long pairs with any of the lat/long pairs within the 100 meter radius would not find any coincidence even though the mobile device passed within that radius.

SUMMARY

In a broad aspect of the embodiments there is a method, computer program product, and system for geo-location determination of the entry by a mobile device to a predetermined geo-fenced region defined in at least two dimensions. The mobile device includes a geo-location determination mechanism and to determine whether the mobile device has entered the geo-fenced region a first geo-location of the mobile device at a first time is identified. The first geo-location is in at least two dimensions and is determined using the geo-location determination mechanism. The first geo-location has a first related error of determination for each of the at least two dimensions of the first geo-location. The first geo-location and the first related error are expressed in a predetermined measure.

Also, a second geo-location of the mobile device at a second time is identified. The second geo-location is in at least two dimensions and is determined using the geo-location determination mechanism. The second geo-location has a second related error of determination for each of the at least two dimensions of the second geo-location. The second geo-location and the second related error are expressed in the predetermined measure.

A potential travel path of the mobile device is determined between the first geo-location and the second geo-location using the first and second related errors. The potential travel path is in at least two dimensions. A determination is made as to whether the potential travel path intersects with the predetermined geo-fenced region. If the potential travel path intersects the predetermined geo-fenced region by an amount that satisfies an intersection requirement, a determination is made that the mobile device entered the predetermined geo-fenced region.

Details concerning computers, computer networking, software programming, telecommunications and the like may at times not be specifically illustrated, as such were not considered necessary to obtain a complete understanding nor to limit a person skilled in the art in performing the embodiments, are considered present nevertheless as such are considered to be within the skills of persons of ordinary skill in the art.

A detailed description of one or more preferred embodiments is provided below along with accompanying figures that illustrate, by way of example, the principles of the embodiments. The scope of the embodiments is limited only by the appended claims and the embodiments encompass numerous alternatives, modifications, and equivalents. For the purpose of example, numerous specific details are set forth in the following description to provide a thorough understanding of the embodiments. The present embodiments may be practiced according to the claims without some or all of these specific details. For the purpose of clarity, technical material that is known in the technical fields related to the embodiments has not been described in detail so that the present embodiments are not unnecessarily obscured.

Although the foregoing embodiments have been described in some detail for purposes of clarity of understanding, it will be apparent that certain changes and modifications may be practiced within the scope of the appended claims. It should be noted, that there are many alternative ways of implementing both the process and apparatus of the present embodiments.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background or prior art forms part of the common general knowledge.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, and an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their function. Whether such function is implemented as hardware or software depends upon the particular application and design constraints imposed on the overall system. Skilled artisans may implement the described function in varying ways for each particular application, but such implementation decisions should not be interpreted as causing a departure from the scope of the present embodiments.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM, flash memory, ROM, EPROM, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 depicts a top view of a pictorial two-dimensional representation of a mobile device geo-location and the geo-fence according to one embodiment.

FIGS. 4a and 4b depict an illustration of a two-dimensional side view aspect of the error of location determination according to one embodiment.

FIG. 7 depicts a volume between two times where the associated error of determination changes according to one embodiment.

FIGS. 8a, 8b and 8c depict the 2 dimensional and 3 dimensional intersection to three different degrees of a possible path with a geo-fenced region according to one embodiment.

DETAILED DESCRIPTION

Figure 1:
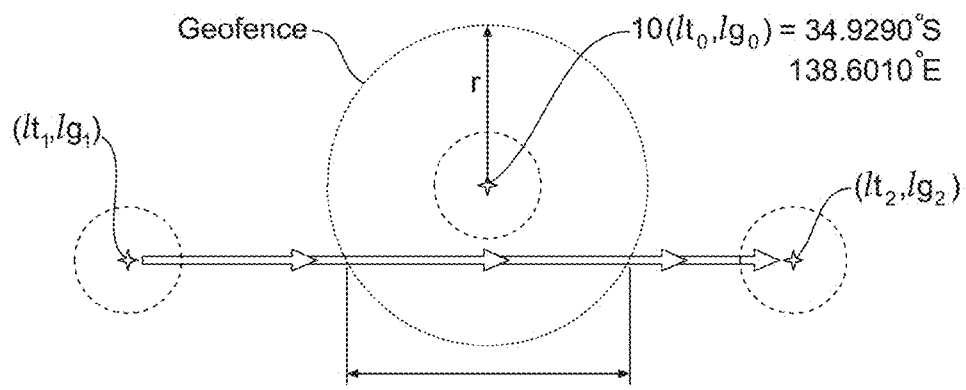
FIG. 1 depicts a prior art example of a geo-location technique.

The methods described in this specification are a retrospective path analysis because the method analyses a created path between two locations of a mobile device to determine if the mobile enters or entered a geo-fenced region. The mobile device will be capable of making a location determination using one or more of the available location determination techniques available to that device where each determination has a respective accuracy of determination, then based on the determined location at two intervals of time the possible path is determined (which includes the possible error) between the determined locations and which can then be compared with a predetermined geo-fenced region to analyse whether there was an intersection of the possible path with the geo-fenced region. It is also advantageous to make the analysis determine within a predetermined certainly whether the intersection occurred by, in one example, determining whether the percentage of intersection is greater than a predetermined amount.

When referring to a device having location determination techniques and associated hardware it would be typical that the device is a smartphone (this term is often used in this specification). However, any device having a self-contained power supply and a location determination technique available to it with its applicable predetermined accuracy is intended to be covered, so that by way of example, the device may be dedicated to a transportable container, the device may be part of a vehicle, the device may be part of a machine, the device may be connectable to any of the above or may be a small part of a larger mobile arrangement.

In this specification, the position estimates provided by one or more devices attached to personnel and/or vehicles or physical assets may also be referred to herein, for example, as "location estimates" or "tracking estimates." A "track" or "path" or "trajectory" may comprise a collection of position estimates that may result from the use of the location data made available by a respective device or in some instances a location estimate will be the output of the fusion of two or more location determination devices or techniques along with a respective error determination of the fused location determination.

In one embodiment, the method uses exiting capabilities within smart phones or other devices in order to determine a devices' location with respect to its location from a predetermined location or geographical area. It may be that there is more than one location determination application/device in the smart phone and each one, is used in turn or a combination of them is used to determine the location, wherein the associated known error of determination of each technique is used such that the most accurate location determination technique is used or a calculated combination of those errors is used.

The determination of the location of the device relies on the use of a location determination technique usable by the device, wherein the location determination technique has a respective accuracy of determination. The device knows its location but only within the accuracy of the location determination technique and respective hardware and other factors.

Various location determination techniques are available to a device but each of them has different known accuracies. For example, GPS can have accuracy down to meters, in another example, WiFi based determination accuracy can be dependent on the signal strength at the time of the determination as well as other factors and may range from meters to tens of meters. The accuracy figure used can be conservative or mid-range or at an extreme, but as long as there is consistency of usage of the known accuracy criteria the method as described by embodiments herein can be used.

The technologies used for location determination of a device may include, the Global Positioning System (GPS), sector (telephony base station) position determination using for example IposDet (on CDMA networks), cellular tower (Cell ID) and Wi-Fi (802.11) access points which rely on the transmission of unique identifiers and related known location data to permit the triangulation of the receiving device. The use of hybrid technologies such as these can, by themselves, allow for position determination despite the occasional unreliability of one or more of them in different environmental and physical locations of the device.

It is a further application of the available features of a smart phone or other mobile computing device that the location determination is associated with a certain action that the device is to perform as a result of the presence of the mobile device at a predetermined location or within a region about the predetermined location such as can be defined by a geo-fence.

The manner in which a device provides location can depend on the technology that is used to derive that location. There are numerous technologies for position determination and associated with each technique there will be specific details of their accuracy. A location is generally expressed using the WGS (world geodetic system) 84 framework. This is used as a basis for expressing locations within GPS and all common smartphone platforms. Some location determination quantification standards exist that do not fall under WGS 84 such as ED50, ETRS89, GRS 80, NAD 83, DAVD88, SAD69, SRID and UTM. The use of a standard ensures that all manufacturers that design GPS devices and that use the output from such devices can readily generate GPS data that will be accepted by users of that GPS data to add value to the location determinations provided.

As for all real world systems there is error which needs to be accounted for and accuracy is affected. By way of explanation, GPS error analysis examines the sources of errors in GPS results and the expected size of those errors. GPS makes corrections for receiver clock errors and other effects but there are still residual errors which are not always corrected. Sources of error include signal arrival time measurements, numerical calculations, atmospheric effects, ephemeris and clock data, multipath signals, and natural and artificial interference. The magnitude of the residual errors resulting from these sources is dependent on geometric dilution of precision. Thus when the term "location determination" is used the actual manner in which a location is presented is wholly dependent on the location determination technique used to determine that location and that there will be a known accuracy of determination which itself may be dependent on the application of the respective technique to the circumstances of the determination and which may be applicable to the determination only at the time of the determination and updated with future determinations. For example, a GPS location determination can have a range of accuracies, mostly dependent on the number of satellites that are available from which to derive the location complicated by one or more of the errors noted above.

In the application of the method described in this specification there is preferably use of a predetermined accuracy of location determination associated with each location determination technique available to the device and that accuracy is expressible as a distance + and − of both the x and y co-ordinate about the determined location in the case of a 2-dimensional assessment of the accuracy of the location determination, or as a distance + and − of the x, y and z (vertical) co-ordinate about the determined location in the case of a 3-dimensional assessment of the accuracy of the location determination, so that accuracy can be used in the process of determining the possible path of the mobile device.

It is also preferable to apply a predetermined marginal distance when a location determination is conducted by the mobile device; this is done when, in particular, the determined location is close to geo-fenced region. It will be noted that the term geo-fenced region is used, since it is intended to apply in the case of a geo-fenced 2-dimensional area and in the case of a geo-fenced 3-dimensional volume.

Thus, by way of example, if the location determination technique has an accuracy when converted to a distance of +/−100 meters, then when a location determination is made that indicates that the device is 100 meters from a predetermined location or region, there is a chance that the device is actually already at the predetermined location or region because the location determination could be out by the 100 meters due to the inaccuracy of the location determination. The existence of an error of location determination thus has the potential to over or under estimate the actual location of the mobile device but conversely then has the potential to indicate entry into a predetermined geo-fenced region when it is not and to indicate entry into a predetermined geo-fenced region after it is clearly already within the region or in some cases has already passed the region as illustrated in a simple example in the Prior Art FIG. 1.

Figure 2:
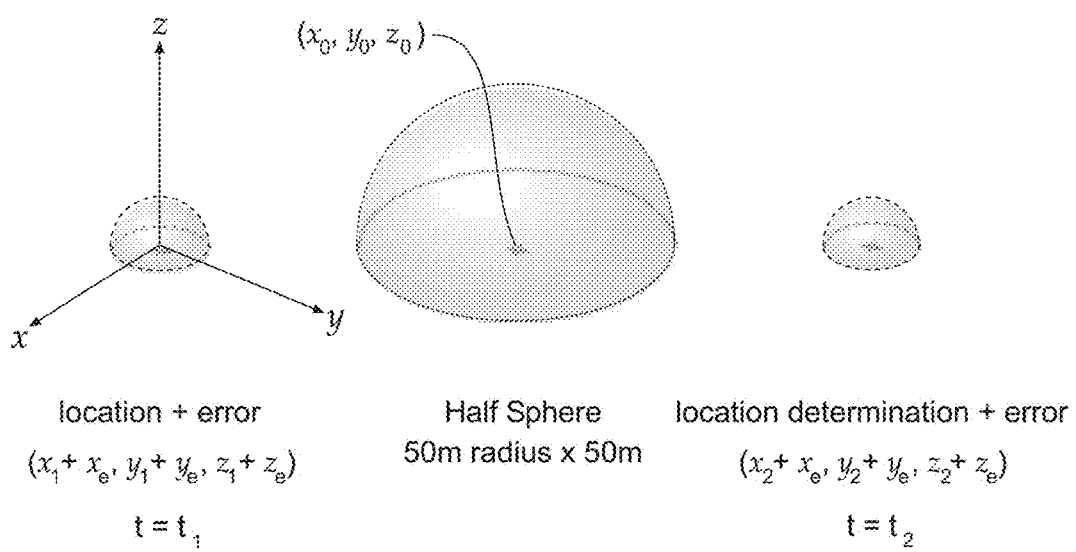
FIG. 2 depicts a pictorial representation of two location determinations according to one embodiment.

FIG. 2 depicts a pictorial representation of two location determinations including error at times $t_1$ and $t_2$ in a 3-d coordinate system and a predetermined location having a 3-d geo-fenced region.

The representation of the location of the mobile device at times $t_1$ and $t_2$ is pictorial in that the respective possible location is pictorially represented by half a sphere, indicative of the error in determination provided by a geographic location technique assumed to be the same in each of the x, y and z axes, thus the determined location at time $t_1$ in the x axis is $x_1+x_e$ where $x_e$ is the error in the determination of the x value of the location, the same applying to the y and z axes respectively.

So as to make this a more tangible value a latitude value of 34.9290° S with an error of 0.00001 degrees is used. This error in latitude translates into about 11 meters and if the error in longitude is of the same order then the error in longitude translates into about 9 meters. So the base of the sphere representation is not ideal in that the error shape in the x-y plane is not a perfect circle but it would be difficult to visually tell the difference.

With respect to the vertical z axis determination a GPS location determination of altitude is typically within 15 meters, but it is also known to be 1.5 times the horizontal error specification, so in accord with the example above the vertical error could be 16.5 meters using the worst of the latitude and longitude error values. Thus again the top of the spherical representation is not pictorially correct having a flatter representation than should in fact be the case.

Also depicted in a geo-fenced region defined by a known location $x_0$, $y_0$ and $x_0$ having a 3-d geo-fenced region of 50 m radius and 50 m in the z (vertical) component at the center of the 2 dimensional 50 meter radius circle thus defining a half-sphere geo-fence region having an origin at the center of the 50 meter radius circle in the horizontal plane of the geographic location on the surface of the earth.

It is therefore typical for the geo-fenced regions to be created larger in dimension than possibly required to ensure that the entry is more likely to be indicted taking the inaccuracy of the mobile device location determination, for example 100 to 500 meters about a predetermined geographic location with a geographic framework. However, that is not always an advantage, since, too large a geo-fenced region and an action being triggered in a mobile device when the user is not likely to be in a reasonable distance of the contact location within the created geo-fenced region, can be a disincentive to the users of this function.

Furthermore, the perceived need for large geo-fenced regions can make it difficult to manage multiple closely located contact points having respective geo-fenced regions which will thus overlap/intersect each other.

Yet further the geo-fenced region is typically 2 dimensional involving predetermined latitudes and longitudes and is also the simplest of shapes being rectangular of square, mainly due to the rectilinear shape of buildings which lie generally central to the geo-fence region. Thus when dealing with passing walking and vehicular traffic the geo-fenced region is a reasonable shape for its intended purpose. In the case of a multi-story shopping complex in which a store is located in an above ground location it is not ideal that the geo-fenced region created in 2-dimensions but all entries whether the user is on a completely different floor, thus, as in now possibly in the arrangements described herein, a 3-d representation of the geo-fenced region is more useful and can be smaller if the techniques described herein are used to ensure that even if the user passes through the predetermined geo-fenced region there will be a recognition that was the case.

Further the retrospective approach allows for the geo-fenced region to be configured in very many forms and of any size, starting at a single geographical location (latitude, longitude) pair with or without an altitude value and including a region having any 2 dimensional shape or any 3 dimensional shape (e.g. hemi-spherical, spherical, cube, cone, barrel, cylinder, square and polygonal prism, pyramid, etc. truncated versions of any 3 dimensional shape.

The term intersect is used to illustrate that the volume of a 3-dimensional geo-fenced region has points within it that are common to points within retrospective path created by the motion of the mobile device, while also illustrating that the same will apply when there are common points if the geo-fenced region is 2-dimensional in that the pictorial shapes representative of the respective areas intersect when there are common points (geographic values within the predetermined geo-graphic framework).

Thus, with the ability to determine intersection of a possible path with a predetermined geo-fenced region (which may be very small or as small as it only needs to be), it then also becomes possible to have smaller geo-fenced regions than previously was the case. So as described previously, in one extreme example, the geo-fenced region can be a single point (x, y, and z) and in another extreme example a line of predetermined length, and the determination of an intersection can still be achieved even though the mobile device does not determine a location which is coincident with the point or line. In the case of a line it may be that the line acts like a boundary and crossing the boundary (when location determination is such that geographical location determination including error and a surety factor (to be described in greater detail later in the specification) indicates an intersection which persists to indicate that the mobile device has traversed from one side to the other of the line) is used to trigger one or more events or consequences.

Thus in typical conditions, location updates are generated by the mobile device with a margin of error and as location updates are received sporadically, and geo-fences are usually of a substantial size (i.e. not smaller than 5 meters in at least all directions) it is not possible to define small and precise geo-fences (e.g. one centimeter wide and possibly centimeters long, and also vertical if a 3 dimensional region is involved), since it is not possible in any prior art arrangement to reliably determine if a device has travelled into such a small region partly because of the interval between geo-location of the moving device, partly because of the uncertainty of the geo-location determination and whether there is an entry or no-entry determination with no margin for possible entry error. This problem becomes particularly exacerbated if either the location update has a large margin of error or if the device is travelling at a high speed, increasing the distance traveled between updates of intermittent location determination and thus increasing the likelihood that an intersection will occur even though the mobile path may physically traverse the geo-fenced region.

An example of the above issue is illustrated in FIGS. 3, 4a and 4b where even despite the error in geo-location determination there is no recognition by the mobile device that it was in the geo-fence set up in the region of the store at 36 on street 38, even though it passed directly by the store. The possible geo-location determination of the mobile device is illustrated by the half sphere 30 at $t_1$ which illustrates the determined location plus and minus the error (as disclosed earlier in the specification) and a geo-location determination at $t_2$ with its associated error illustrated by the half sphere 32, the geo-fenced region of the store is represented by the half sphere 34 at the store location 36 along the same street 38 the mobile device traversed. The geo-fenced region is virtual and thus does not include any error.

The same situation would have occurred if the mobile device geo-location and the geo-fence were in 2 dimensions and illustrated as circles on the ground level depicted in FIG. 3, first about the mobile device at times $t_1$ and $t_2$ as well as the store location 36.

FIGS. 4a and 4b are used to illustrate the 3-dimensional aspect of the error representation at $t_1$ and $t_2$ against the side-view of the height of the buildings in the street scape. This view is merely used to pictorially illustrate the virtual shape of the region within which the mobile device could actually be with respect to the geo-location determined by the mobile device respectively at times $t_1$ and $t_2$.

FIGS. 5, 6, 7, 8a, 8b, and 8c are illustrative of one approach to determining the entry of the mobile device into a geo-fenced region despite the abovementioned issues and possibly others.

Figure 5:
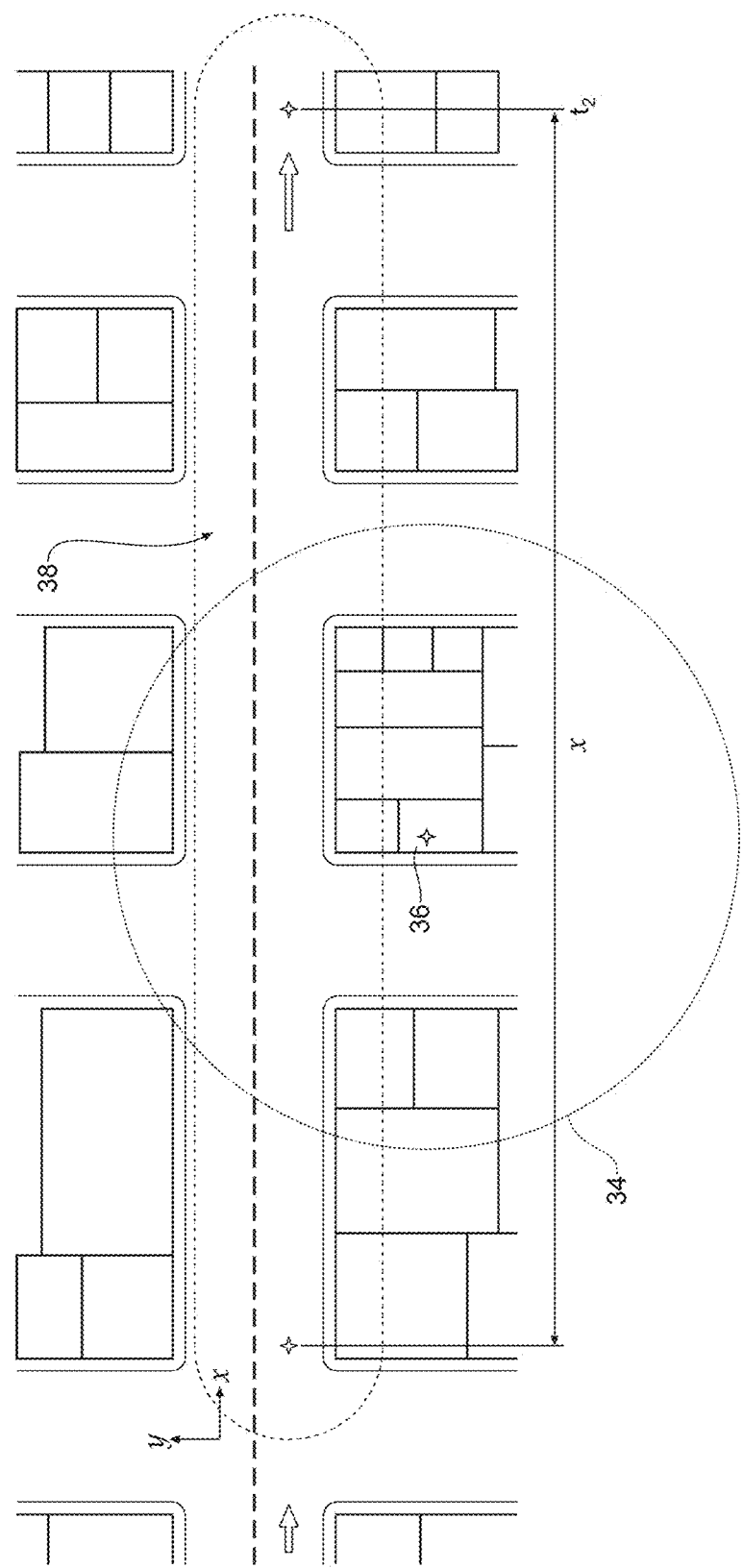
FIG. 5 depicts an illustration of the effect of assuming that the mobile device could possibly be in a location within an illustrated boundary according to one embodiment.

FIG. 5 depicts an illustration of the effect of assuming that the mobile device could possibly be in a location within the illustrated boundary between the times $t_1$ and $t_2$ using a 2 dimensional top view of a representation of a city scape.

FIG. 5 illustrates the effect of assuming that the mobile device could possibly be at any location between the times $t_1$ and $t_2$ and in this embodiment that the possible location of the mobile device is coaxial with a straight line between the geo-located locations at those times and is illustrated as a circle that appears to translate across the surface of the land leaving a path of possible locations. This is illustrated by the parallel dotted lines forming a path in 2 dimensions along the surface of the city scape. In practice since the illustration is of a city scape it might be that the error or determination is larger since, if GPS is used, there may only be the minimum of satellites to use to make the location determination and thus the error of determination will be greater than if the determination was made in an open country environment.

In the 2 dimensional version illustrated this assumes the mobile device travelled along the same plane which for most locations on the surface of the earth is a reasonable approximation. In a 3-d version the starting altitude and the finishing altitude are taken into consideration.

The determination of intersection thus becomes a mathematical determination which may, but not necessarily so, and may include some assumptions regarding the geometry of the volumes representing the determined geo-location at each time and the respective error value for both the latitude and longitude and the applicable the altitude.

It is noted that the error in altitude may be improved by fusion of the geo-location technique with one or more other altitude determinations by other techniques, such as, pressure gauge, altimeter and other devices and sensors or sensor information made available to the mobile device locally or from a then local source.

Figure 6:
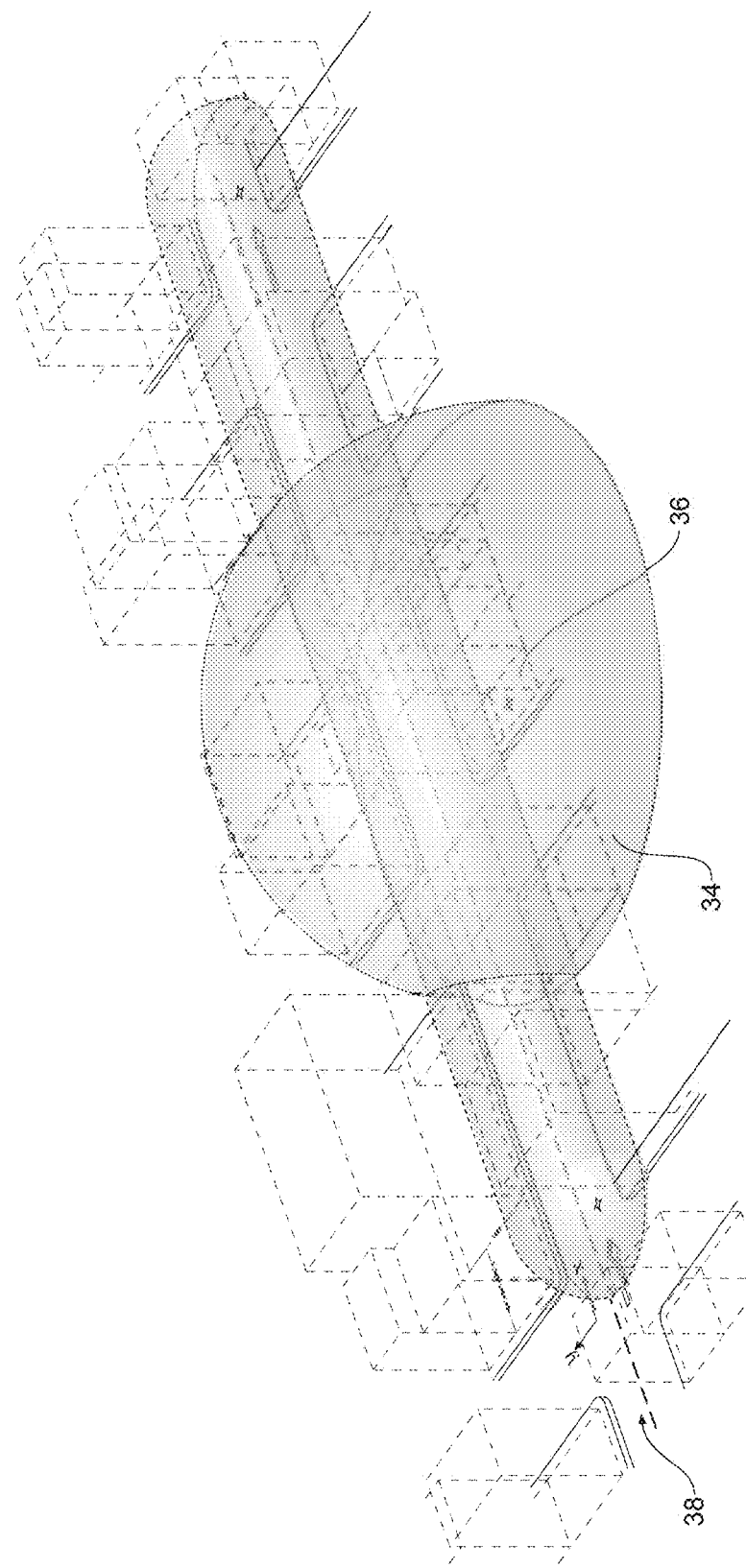
FIG. 6 depicts a volume between two times according to one embodiment.

FIG. 6 depicts a volume between times $t_1$ and $t_2$ representing all the possible locations of the mobile device within a predetermined geo-location framework in a 3 dimensional perspective view of a representation of a city scape.

Thus the volume shown in FIG. 6 between $t_1$ and $t_2$ represents all the possible locations of the mobile device within a predetermined geo-location framework, e.g. WGS84. The volumetric representation is most useful since it is clear that the possible location of the mobile device partially intersects with the geo-fenced region 34 about the shop location 36 on street 38.

The mathematical calculation that provides the same conclusion is a little more difficult to illustrate. A simplified example is provided below:

The initial step requires the calculation of all of the planes tangent to the two spheres representing the possible location of a device in 3d space taking into account the possible error of location determination for each location determined, at two distinct and sequential times. The equation of the tangent plane to a sphere of radius r and centre at the origin at latitude θ and longitude Ø is $$x \cos(\theta)\sin(\emptyset) + y \sin(\theta)\sin(\emptyset) + z \cos(\emptyset) = y^2$$

However it is necessary to ensure that we only take into account planes that are tangent to both spheres and reject those not tangents to both spheres. Once these planes described above are taken into account the region defined between them can be described as having a cylindrical shape that may or may not have bases of varied size.

Alternatively if a straight travel path is not assumed it is possible to replace the cylindrical shape with a single plain hyperboloid defined by the formula $$\frac{x^2}{a^2} + \frac{y^2}{b^2} - \frac{z^2}{c^2} = 1$$

in a standard Cartesian coordinate system.

Figure 14:
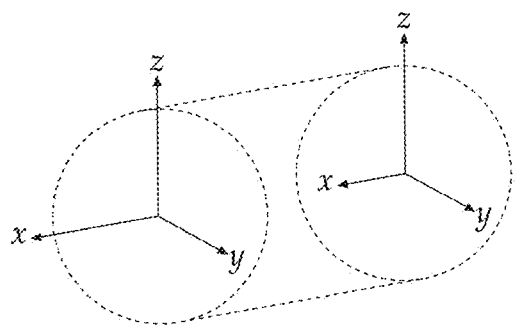
FIG. 14 depicts a three dimensional representation of a possible path of a mobile between two determined locations according to one embodiment.

The determination of the possible travel path of a device within 3 dimensional spaces will take the form of a composite solid as defined by both spheres (or half spheres as the case may be) and the volume between them along, in one embodiment, a straight connecting path representing the possible location of the device in 3 dimensional space and the cylindrical shape or single plain hyperboloid area defined by the planes tangent to both spheres (or half spheres as the case may be). A 3 dimensional representation of this possible path is depicted in FIG. 14 in this case by using fully spherical representations of the two location determinations at the beginning and end of the possible path of the mobile device.

In one example of a way in which to use geo-location data as determined for the mobile device, which can then use appropriate software to determine the intersection according to the mathematics provided herein, the National Marine Electronics Association (NMEA) data output from a GPS chipset looks like the following in respect to the latitude and longitude output:
37.818046 and 144.979757.

These values can be negative or positive between −180 and 180, inclusive of all degrees and fractions of degrees.

The National Marine Electronics Association (NMEA) data output from GPS from a GPS chipset looks like the following in respect to the altitude:
+44.31 m above sea level. Please note that this output can also take on a negative value and reported to many decimal points.

The National Marine Electronics Association (NMEA) data output from GPS from a GPS chipset looks like the following in respect to the error or respective measurements:
3.9 m possibly for each dimension measured. This output cannot be negative and can be reported to many decimal points and is representative of a radius for lat/log and altitude.

To be able to decrease the size of (or use unusually shaped) geo-fences and determine if a mobile device has entered an extremely precisely defined geo-fence, it is necessary to eliminate or decrease the impact of intermittent location updates and large margins of error for each location update of the mobile device.

To minimise the impact of these and other deficiencies of prior arrangements, the technique as described in a number of embodiments herein includes, at every location update, an assumed travel path between its last known location and current location and a determination based on the determined geo-location at those times, and of the possible location of the mobile device within the known errors of those determinations in two or more dimensions. Then a determination of whether this possible travel path and associated possible locations associated with the possible travel path, intersects to a sufficient degree, either a predetermined geo-fenced region or a predetermined geo-fenced line length, the latter geo-fence shape only being possible when the technique disclosed herein is used but which would not be contemplated with prior arrangements.

If a travel path is deemed to have intersected to a sufficient degree, that is a basis for indicating that a device has entered the predetermined area or crossed a predetermined line, so and any actions or communications associated with a device entering the predetermined area or crossing the predetermined line are then executed.

The matter of whether the intersection is to a sufficient degree is a matter of setting up the technique of determination to calculate the proportion of intersection, in the case of a 2 dimensional determination that would be a comparison of area of overlap, in the case of a 3-d determination that would be a comparison of common volume and in the case of a geo-fence line the coincidence of one or more points along the line with one or more of the points in the possible travel path.

The further determination of what proportion is sufficient, is a matter having a number of considerations, including in no particular order, the surety of the system to provide a working arrangement in the commercial environment of the application of the technique. Thus if the intersection were sufficient at a 10% proportion it might be that users of the mobile application that implements aspects of the technique will become bothered by the interruption caused by the events or actions triggered by that intersection, on the other hand the, entity that has created the geo-fenced region wants to maximise any and all intersections and thus wants the 10% proportion. The same could be said for any of the infinite values of proportion that can be determined. Another consideration is the relative area/volume of the geo-fenced region and when it is very small then the proportion could be acceptable when it is small but for larger area/volumes of a geo-fenced region the proportion should be larger, say 40%.

It is also possible to adjust the degree of intersection because of the speed of travel of the mobile device. The speed of the mobile device being readily determined by calculation based on the location determinations made at the respective times $t_1$ and $t_2$ or by extrapolation from prior location determinations or from accelerometer readings, these and other ways of determining speed may be available to the mobile device or using those features of the mobile but determined in a server in communication with the mobile device.

There may be other influences on the setting of a degree of intersection based on the direction of travel of the mobile device, the time of day, the location, the date and many other factors used for various reasons such as the cost of determination, the accuracy of determination, the economic reason to make the determination (toll way entrance determination, etc.), and practical implementation reasons.

It is largely up to the entities and service provider (e.g., a system administrator) to set the proportion of intersection in what scenario, which will trigger a determination of entry to a geo-fenced region.

FIG. 7 depicts a volume between times $t_1$ and $t_2$ representing all the possible locations of the mobile device within a predetermined geo-location framework wherein the associated error of determination changes between times $t_1$ and $t_2$. The change is graduated over the movement between the times $t_1$ and $t_2$ representing an approximation but such an approach is practical and more readily calculable.

FIGS. 8a, 8b and 8c depict a variety of 2 dimensional geo-fence region shapes and by extension each of them can have a 3-d geo-fenced region by applying a suitable altitude/vertical dimension which can extend from every one of the geo-fenced points in the 2 dimensional region or from one or more of those points, thus the 3-d shape of a geo-fenced region may look very unusual but the entity creating the region will want to have a choice of any suitable shape they deem appropriate in the circumstance.

The translation of the geo-fenced region into an appropriate geo-fenced framework (e.g. the use of latitude, longitude and altitude within the WGS84 framework), if not defined, is a formulaic process. The format of the description of the geo-fenced region is usable in a mobile device and is in one embodiment transferred to the mobile device as part of the operation of an appropriate application executing on the mobile device. It may be that the mobile device does not make the relevant determinations and they are performed by a server which has the capacity to receive a stream of location determinations from one or more mobile devices and having knowledge of the various geo-fenced regions, performs the determination of sufficient intersection. There are many ways to perform the techniques described and disclosed in this specification, all well within the skill of those skilled the relevant art, which is not related to the technique itself but rather in the general computer programming, network and communications fields.

Determination of location has been described previously in this specification and can involve the mobile device using any number of possible location determination techniques (i.e. GPS, WiFi, Cell Tower Triangulation, inertial navigation, etc. and combinations thereof). Location updates received by the mobile device or a server via a communications' capability between the mobile device and the server, are in one embodiment, expressed as a combination of a latitude and longitude and, if being used, altitude coordinates and a time record of the update. The location data can also include an associated Margin of Error. These data are typical outputs of a GPS chipset the format of which is also typically in accord to a known standard but this will depend on the GPS chipset manufacturer.

The corresponding time records allow the records to be sorted chronologically if required. For each location update received, the device will first determine if the location is within a predetermined geo-fenced region. If the location update does fall within the predetermined geo-fenced region—it will determine that the mobile device has entered the region and then perform actions associated with its entry to the region, such as communications of the event to external systems, or log its entry internally in the memory of the mobile device.

With each location update stored, the device will associate the time at which the location determination was made. The mobile device will continue determining further locations. Every time a new location update and margin of error is received, the mobile device or server which can also be a repository of that data can also access the last stored location update and associated margin of error.

Whether it is the mobile device or the server, a possible travel path for the mobile device can be determined, in one embodiment according to the following method, where the mobile device obtains the last known location update and margin of error at the time it was determined, where the margin of error represents a possible location of the mobile device at that time $t_1$. The mobile device then obtains the current location update and margin of error, where the margin of error represents a possible location of the mobile device at the time $t_2$ of that location determination. The device or the server calculates an area, in the case of 2-d, and a volume, in the case of 3-d, encompassing both possible locations of the mobile device and the area volume between the two possible locations assuming that a straight line of travel is taken by the mobile device, the straight line being between one possible location of an update and the possible location of the second update. The area or volume effectively radiates outwards from the straight line and is used for the purposes at hand regardless to whether the mobile device actually travelled in a straight line. In practice the travel will generally be in a straight line due to the frequency of the location determinations regardless of the speed of travel.

FIGS. 6, 7, 81, 8b, and 8c attempt to illustrate the volume approach wherein the volume when projected over the surface representing the ground is the area. However, the mobile or server only deal with mathematical representations of these shapes, and thus have the ability of determining whether one or more of the points within the area or volume intersect with the mathematically represented geo-fenced region.

Figure 9:
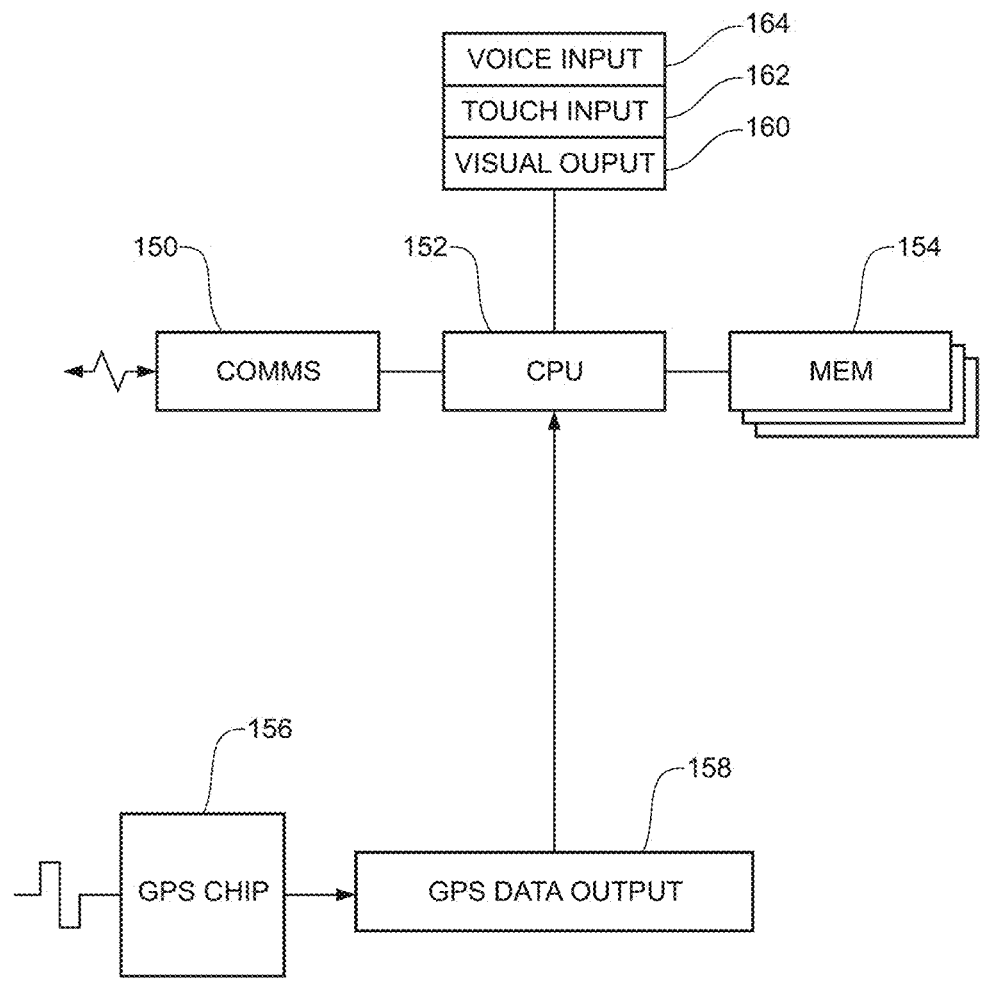
FIG. 9 depicts one form of a data packet including the output from a GPS chip representative of a location and error determination of the GPS chip according to one embodiment.

FIG. 9 depicts data 158 including the output from a GPS chip 156 representative of the location and error determination of the GPS chip 156 (as described previously in the specification) useable by the mobile device or a remote server. FIG. 9 also depicts in functional block form an embodiment of some of the hardware used with in a mobile device to provide communication external of the mobile device and location determination.

The GPS chip 156 typically operates independently of the mobile device except to draw power and provide location determination output 158 of the form described previously in this specification and typically in accord with standards so that the data can be used widely by mobile devices and external servers for a great variety of applications. The time between location determinations is typically an automatic function of the GPS chip settings from the factory and again in accord with the applicable standard but in some cases timing and other characteristics can be controlled (generally within factory set limitations) by the CPU 152 of the mobile device. Each location determination data output 158 generated by the GPS chip 156 is made available to the CPU and is processed and/or communicated to the memory 154 of the mobile device and the communications hardware 150 of the mobile device for in some arrangements made available to one or more remote servers (as discussed previously in this specification).

The functional block diagram of this representation of the mobile device is representative of a well-known configuration and it is well within the skill of those in the art to configure the hardware and complementary software to provide the functionality described. The software that is used to determine the possible path of the mobile device and compare it with the predetermined geo-fenced region is operable by the mobile device using the memory 154 to store the operating software and for storage of temporary data created during the various calculations and comparisons, the CPU 152 to execute that software, or to manage the making available of the GPS data output via the communications hardware to a remote server and the receipt back of one or more data representative of an alert or notification or an action instruction or additional data associated with the action for use by the mobile device. The visual output device (typically a text and image display device) receives one or more such data for providing an user interface for display of related data and other elements of the mobile device include a touch sensitive input device (typically integrated with the visual output device) to provide a user interface for receipt of actions and data from the user of the mobile device and may also include voice input from the user to a voice input device 164. The above assumes that there is a human user of the mobile device but as described in the specification the mobile device may be associated with any article including by way of examples, a vehicle, which may or may not interact at a data level with the mobile device, but if so via an interface between the article and the CPU (not shown).

Figure 10:
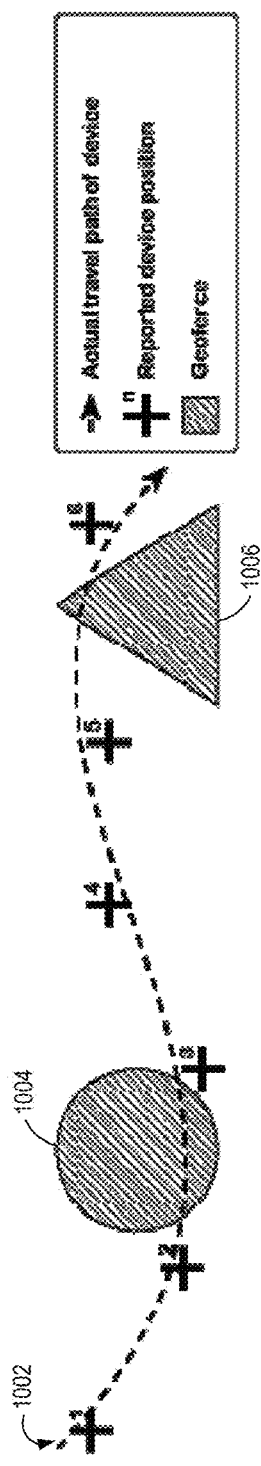
FIG. 10 depicts a travel path of a mobile device according to one embodiment.

FIG. 10 illustrates a path 1002 travelled by a mobile device as it travels through geo-fences 1004 and 1006. As the mobile device travels the path 1002, the mobile device determines device position 1, device position 2, device position 3, device position 4, device position 5, and device position 6. Device positions 1-6 do not intersect with geo-fence 1004 or geo-fence 1006. However, to verify whether the mobile device entered a geo-fence, each time a device position is determined, the mobile device or a server determines a potential path between the determined position (n) and the prior position (n−1).

Figure 11:
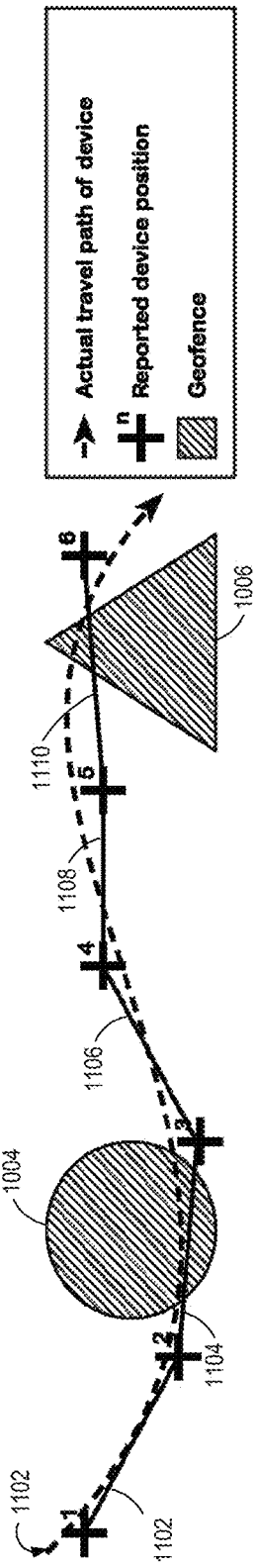
FIG. 11 depicts potential travel paths of a mobile device according to one embodiment.

FIG. 11 illustrates the determined potential paths between the device positions. Between device positions 1 and 2, path 1102 is determined. Between device positions 2 and 3, path 1104 is determined. Between device positions 3 and 4, path 1106 is determined. Between device positions 4 and 5, path 1108 is determined. Between device positions 5 and 6, path 1110 is determined.

A determination is made for each potential path as to whether the potential path intersects with geo-fence 1004 or geo-fence 1006. In this example, a determination is made that travel path 1104 intersects with geo-fence 1004 and that path 1110 intersects with geo-fence 1006. Further, based on the intersections a determination is made that the mobile device entered geo-fences 1004 and 1006. These determination are made by the mobile device or a server.

Figure 12:
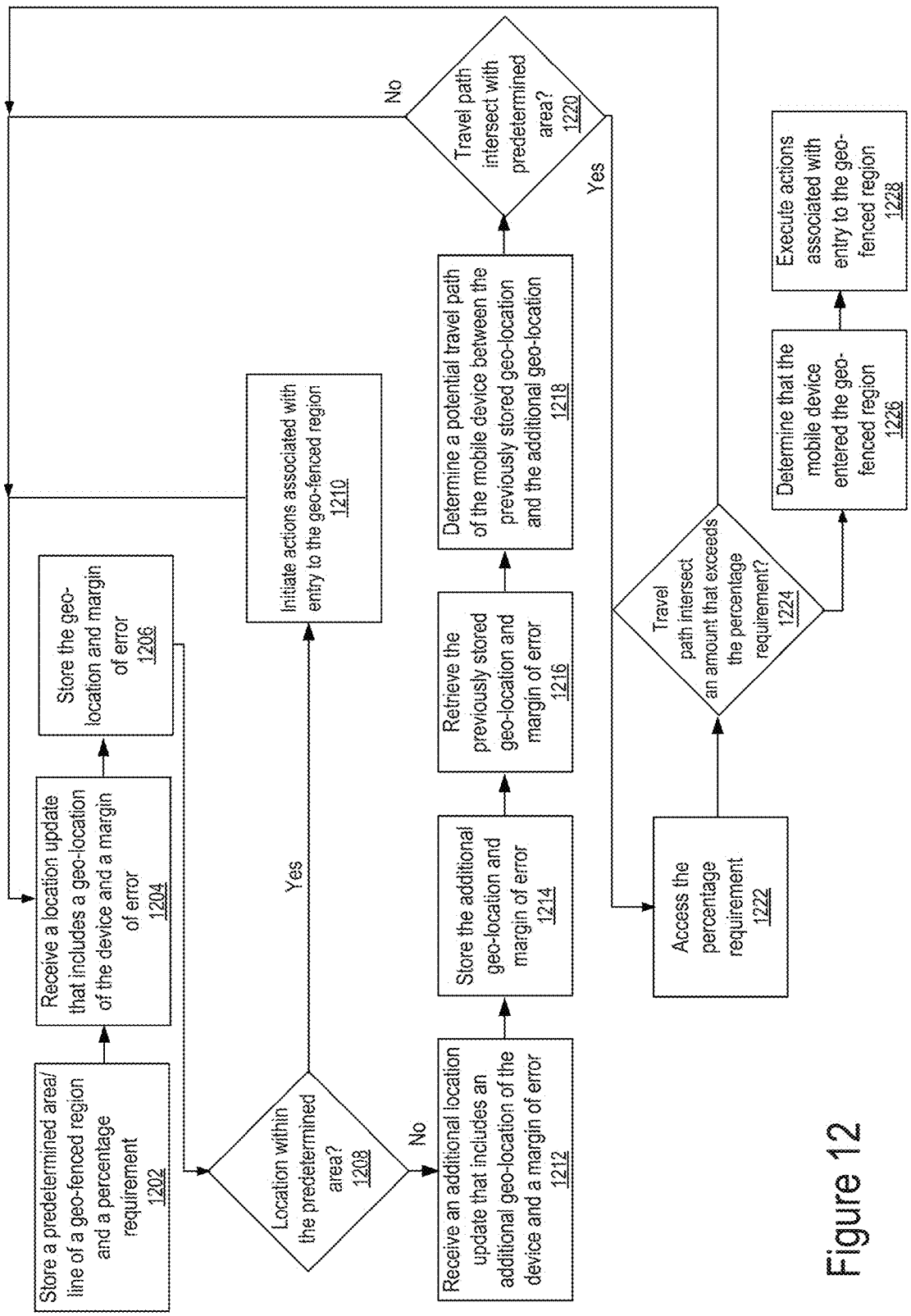
FIG. 12 is a flow diagram illustrating a process of determining whether a mobile device pass through a predetermined area or across a predetermine line according to one embodiment.

FIG. 12 is a flow diagram illustrating a process of determining whether a mobile device pass through a predetermined area or across a predetermine line according to one embodiment. The mobile device stores 1202 a predetermined area/line of a geo-fenced region and a percentage requirement. The mobile devices receives 1204 a location update that includes a geo-location of the mobile device associated with a margin of error. For example, the geo-location may be received from a geo-location determination mechanism (e.g., a GPS chip) of the mobile device.

The mobile device stores 1206 the geo-location and margin of error internally. The mobile device determines 1208 if the geo-location is within the predetermined area of the geo-fenced region taking into account the margin of error. If the geo-location is within the predetermined area, the mobile device 1210 initiates actions associated with entry to the geo-fenced region (e.g., offer user of the mobile device a coupon or offer) and step 1204 is then repeated. If the geo-location is not within the predetermined area, the mobile device receives 1212 an additional location update that includes an additional geo-location of the mobile device and an additional margin of error. The mobile device 1214 stores the additional geo-location and the additional margin of error.

The mobile device 1216 retrieves the previously stored geo-location and margin of error. The mobile device determines 1218 a potential travel path of the mobile device between the previously stored geo-location and the additional geo-location using the margins of error. The mobile device determines 1220 whether the potential travel path intersects with the predetermined area. If the travel path does not intersect with the predetermined area, step 1204 is repeated. However, if the travel path intersects with the predetermined area, the mobile device accesses 1222 the percentage requirement and determines 1224 whether the travel path intersects with the predetermined area an amount (e.g., a percentage) that exceeds the percentage requirement. If the amount does not exceed the percentage requirement, step 1204 is repeated. However, if the amount exceeds the percentage requirement, the mobile device determines 1226 that it entered the geo-fenced region and executes 1228 actions associated with entry to the geo-fenced region.

The predetermined percentage requirement is a matter of choice that may depend on a number of factors that may include: the level of surety of intersection that is going to satisfy the needs of the creator/user of the geo-fenced region. For example an intersection expressed as a percentage of 10% might be too little to be sure and which would mean that the recipients of actions/messages/etc. that are initiated by that intersection are a considered by them to be nuisance rather than an attractive force or useful to the recipient. A percentage of 40% may reject too many possible recipients to make the geo-fence useful to the creator/user of the geo-fenced region. A further consideration might be that the shape of the geo-fenced region is so precise that any integer value of percent (e.g., as low as 1%) is useful to both the creator/user and the recipient of the related action.

When the determination is made the mobile device entered the geo-fenced region, the mobile device or a server will initiate any number of actions that are associated with that entry determination. The possibility that the mobile device is able to deliver to the user of the mobile device a pre-stored coupon, brochure, offer, etc. is merely limited by the digital memory capacity of the mobile device that is available to store digital data representative of those things. In another arrangement the determination is made at a server which is by definition remote from the mobile device (not necessarily stationary) and which has the capacity to provide an indication of entry to the respective mobile device using one or more data communication techniques/protocols and equipment not only one or more of the things that are the result of the determination of entry into the predetermined geo-fenced region.

Figure 13:
FIG. 13 depicts an indication provided by a mobile device according to one embodiment.

FIG. 13 depicts a form of an indication displayed by a mobile device, for example, based on an indication of entry provided by the server. While FIG. 13 depicts a visual, on screen notification, notifications provided by the mobile device can take many forms. These can include visual indicators such as flashing lights, audible indicators such as a tone being played via inbuilt speakers, tactile indicators such as vibrations of the device and communicative indicators such as communications passed to secondary devices or systems.

There is really no limitation as to the type of actions that can be initiated following, before or at the same time of the indication of entry into the predetermined geo-fenced region and the following are a non-exclusive list of examples:

a. Decrement an account to charge the mobile device user for entry to a toll-way, a concert, a museum, etc.

b. Record the entry of the mobile device to indicate the location of the user of the mobile within the geo-fenced region, for example, for security reasons, charging reasons, or safety reasons. It may also be possible to use the mobile device to confirm the identity of the user of the mobile device by using identity determination input from the user.

c. Prompt the sending of a notification to the mobile device to alert the user to; a danger; an offer of goods or services; to provide a token of value; etc.

Thus the determination of entry into a predetermined geo-fenced region is something that can be used to initiate one or more actions. The determination of entry can be made by the mobile device or by a server. The mobile device or server that makes the determination of entry can provide an indication of entry to a recipient in a form suitable for the recipient of the indication. Thus in the case of the mobile providing the indication (e.g., to a server), it could be in the form of a digital data packet representative of a unique identifier of the mobile device, the unique identifier of the geo-location region, the time of determination, and which may or may not include the destination address for that information. Thus in the case of a server providing the indication (e.g., to a mobile device), it could be of the form of a single byte of data representative of the entry, which is recognized by the respective mobile device. There are many forms of the indication which will be unique to the particular mobile and server, the one or more applications that will act on the indication, the environment of the geo-location region, the server type and its environment, and the choices that a designer of such systems will make in effecting the method disclosed herein.

The determination of entry or not to a geo-fenced region particularly when the region is a line or relatively small in volume compared to the respective application is thus possible where previously it was not, when using the technique disclosed herein. By implementing the techniques disclosed in this specification, a mobile device would be able to determine to a predetermined degree when entry had been or is occurring and this will greatly improve the location awareness of smart phones and similar devices and create the opportunity to create functions and use cases that were previously impossible.

What is claimed is:

1. A method for determining whether a mobile device entered a predetermined geo-fenced region, the mobile device having a geo-location determination mechanism, the mobile device having a digital data store for storing a predetermined geo-fenced region and a percentage entry requirement, the mobile device adapted to execute an action associated with entry of the mobile device into the predetermined geo-fenced region, and the mobile device having a processor for performing one or more receiving, storing, determining and executing steps, the method comprising the steps:

Receiving, by the mobile device, a first location update that includes a first geo-location of the mobile device associated with a first margin of error;

Storing, by the mobile device, the received first geo-location and first margin of error;

determining if the first geo-location is within the predetermined geo-fenced region allowing for the first margin of error;

responsive to a determination that the first geo-location is not within the predetermined geo-fenced region, receiving, by the processor of the mobile device, a second location update that includes a second geo-location of the mobile device associated with a second margin of error;

storing by the mobile device the received second geo-location and the second margin of error;

retrieving the stored first geo-location and stored first margin of error:

determining a retrospective travel path travelled by the mobile device between the stored first geo-location and the stored second geo-location using the respective margins of error;

determining whether the retrospective travel path intersects with the predetermined geo-fenced region;

responsive to a determination that the retrospective travel path intersects with the predetermined geo-fenced region, retrieving the stored percentage requirement;

determining whether an amount of intersection between the retrospective travel path and the predetermined geo-fenced region exceeds the percentage requirement;

responsive to a determination that the intersection between the retrospective travel path and the predetermined geo-fenced region exceeds the percentage requirement, determining that the mobile device entered the predetermined geo-fenced region; and executing an action associated with entry into the predetermined geo-fenced region.

2. The method for determining whether a mobile device entered a predetermined geo-fenced region according to claim 1, wherein the predetermined percentage requirement is determined based on one or more of a group of factors including:

a level of surety associated with the predetermined percentage requirement, indicating whether a mobile device having a retrospective path intersecting the predetermined geo-fenced region by the predetermined percentage requirement had entered the predetermined geo-fenced region; and a shape or size of the predetermined geo-fenced region.

3. The method for determining whether a mobile device entered a predetermined geo-fenced region according to claim 1, wherein when the determination is made that the mobile device entered the predetermined geo-fenced region, the executed action comprises to one or more of a group, including:

changing a value of an account associated with the mobile device;

recording an entry of the mobile device into the predetermined geo-fenced region; and making available to the mobile device a pre-stored coupon, or a brochure, or an offer for a product or a service.

4. The method for determining whether a mobile device entered a predetermined geo-fenced region according to claim 1, wherein when the determination is made that the mobile device entered the predetermined geo-fenced region the mobile device will initiate one or more actions based on one or more of a group, including making available to the mobile device from a server a coupon, or a brochure, or an offer for a product or a service; and storage in the digital data memory store of the coupon, brochure, or offer.

5. The method for determining whether a mobile device entered a predetermined geo-fenced region according to claim 1, wherein the first and second margins of error are different.

6. The method for determining whether a mobile device entered a predetermined geo-fenced region according to claim 1, wherein the retrospective travel path and the predetermined geo-fenced region each corresponding to respective 2-dimensional shapes, and wherein the amount of intersection corresponds to an area of overlap between the 2-dimensional shapes.

7. The method for determining whether a mobile device entered a predetermined geo-fenced region according to claim 1, wherein the retrospective travel path and the predetermined geo-fenced region each corresponding to respective 3-dimensional volumes, and wherein the amount of intersection corresponds to a common volume of the 3-dimensional volumes.

\* \* \* \* \*

UNITED STATES PATENT AND TRADEMARK OFFICE
CERTIFICATE OF CORRECTION

PATENT NO. : 10,659,916 B2  
APPLICATION NO. : 16/515896  
DATED : May 19, 2020  
INVENTOR(S) : Filip Eldic Page 1 of 1

It is certified that error appears in the above-identified patent and that said Letters Patent is hereby corrected as shown below:

In the Claims

In Column 17, in Claim 1, Line 63, delete "Receiving," and insert -- receiving, --, therefor.

In Column 17, in Claim 1, Line 66, delete "Storing," and insert -- storing, --, therefor.

In Column 18, in Claim 1, Line 10, after "storing" insert -- , --.

In Column 18, in Claim 1, Line 10, after "device" insert -- , --.

In Column 18, in Claim 4, Line 60, after "region" insert -- , --.

In Column 18, in Claim 4, Line 62, after "including" insert -- : --.

In Column 18, in Claim 4, Line 63, after "server" insert -- , --.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*